United States Patent
Sweazy et al.

(10) Patent No.: US 6,773,726 B2
(45) Date of Patent: Aug. 10, 2004

(54) METHOD AND KIT FOR INCREASING THE CHANCES OF CONCEIVING A CHILD HAVING A DESIRED GENDER

(76) Inventors: Scott M. Sweazy, 1747 Village Park Dr., Orangeburg, SC (US) 29118; Jill A. Sweazy, 1747 Village Park Dr., Orangeburg, SC (US) 29118

( * ) Notice: Subject to any disclaimer, the term of this patent is extended or adjusted under 35 U.S.C. 154(b) by 241 days.

(21) Appl. No.: 10/159,927

(22) Filed: May 29, 2002

(65) Prior Publication Data

US 2003/0224065 A1 Dec. 4, 2003

(51) Int. Cl.[7] ............................................. A01N 59/22
(52) U.S. Cl. ....................... 424/670; 424/687; 424/679; 424/692; 424/725
(58) Field of Search ................................ 424/725, 687, 424/670, 692, 679

(56) References Cited

U.S. PATENT DOCUMENTS 3,749,089 A * 7/1973 Derr ............................ 600/345
4,336,801 A * 6/1982 Sentell et al. ................. 604/31
4,788,984 A 12/1988 Marsik

FOREIGN PATENT DOCUMENTS

GB 1454904 A1 * 11/1976

OTHER PUBLICATIONS

Zarutskie P.W., Muller C.H, Magone M., Soules, M.R., "The Clinical Relevance of Sex Selection Techniques", Fertility and Sterility, 1989, pp. 891–905, vol. 52, No. 6.

Lorrain, J., "Pre–Conceptional Sex Selection", International Journal Gynecology and Obstetrics, 1975, pp. 127–130, vol. 13.

Stolkowski, J., Choukroun J., "Preconception Selection of Sex in Man", Israel Journal of Medical Sciences, 1981, pp. 1061–1067, vol.17.

Hingorani V., Shroff G., "Natural Sex Selection for Safe Motherhood and as a Solution for Population Control", International Journal of Gynecology and Obstetrics, 1995, pp. S169–S171, vol. 50.

* cited by examiner

*Primary Examiner*—Jean C. Witz
(74) *Attorney, Agent, or Firm*—Smith Moore LLP

(57) ABSTRACT

A method is provided to take advantage of naturally occurring factors that influence gender selection in such a way as to create a bias to conceive a specific gender. This is accomplished by teaching a woman how to recognize the various stages of her menstrual cycle and how and when to use ovulation predictor reagent strips to accurately predict when ovulation will occur. Specific instructions are provided as to when a couple should engage in intercourse. The method for influencing the chances of conceiving a child of a selected gender includes the steps of following a selected diet; supplementing said diet with selected nutriceuticals; douching with a selected douche prior to intercourse; and selectively timing intercourse.

7 Claims, No Drawings

METHOD AND KIT FOR INCREASING THE CHANCES OF CONCEIVING A CHILD HAVING A DESIRED GENDER

BACKGROUND OF THE INVENTION

The present invention relates to a method, and a kit for practicing the method, for increasing the odds of conceiving a child of a desired gender. More specifically, the present invention relates to a method for biasing the odds of conceiving a child having a selected gender which involves either following a first integrated program of diet, nutriceuticals, douching and timing of intercourse to increase the chances of conceiving a child having a male gender or, alternatively, following a second integrated program of diet, nutriceuticals, douching and timing of intercourse to increase the chances of conceiving a child having a female gender. The present invention also relates to a first kit which facilitates following the first integrated method or a second kit for following the second integrated method.

When thinking of conceiving and having a baby, people often have a preference for a child having a particular gender. However, it is somewhat difficult for a couple to select or even influence the selection of the gender of an as yet not conceived child as many factors influence natural gender selection. It has been well known for many years that gender is determined by the presence of two X chromosomes in females (XX) or one X chromosome and one Y chromosome in males (XY). Sex cells, i.e., the sperm and the egg, are formed from cell divisions of cells with diploid chromosomes of either XX or XY to have only one chromosome type, either X or Y. Union of sperm and egg during the fertilization process results in a zygote containing one chromosome from the female and one chromosome from the male. Thus, only one type of egg results from the female, an egg containing a single X chromosome. But two types of sperm result from the male, one carrying a single X chromosome and one carrying a single Y chromosome. Since these two types of sperm are produced in equal numbers there is a 50-50 chance of conceiving one gender or the other if all other factors are equal since fertilization of an egg by an X-bearing sperm will lead to an XX zygote while fertilization of an egg by a sperm with a Y chromosome will lead to an XY zygote.

It is believed, however, that certain factors can be manipulated to increase the chances of fertilization by an "X" carrying sperm, thereby increasing the odds of conceiving a female child, or alternatively, certain factors can be manipulated to increase the chances of fertilization by a "Y" carrying sperm, thereby increasing the odds of conceiving a male child.

There have been some previous attempts to identify and influence factors involved in the natural gender selection process. Previous efforts in this regard have been disclosed in, for example, U.S. Pat. No. 4,339,434 Jul. 13, 1982 to Erisson and U.S. Pat. No. 4,788,984 to Dec. 6, 1988 to Marsik. Other patents relating to methods for achieving conception and particular gender are U.S. Pat. No. 5,058,084 Oct. 15, 1991 to Riesen and U.S. Pat. No. 4,036,212 Jul. 19, 1977 to Karuhn.

The specific timing of intercourse was shown by Kleegman, S. J. in 1966 to influence gender selection and has subsequently been supported by other investigators. Shettles L B: Factors influencing sex ratios. Int J Gynaecol Obstet 8:643, 1970 & Vear C S: Preselective sex determination. Med J Aust 2:700, 1977.

It is also known that alterations in the production and composition of cervical mucus occur during the menstrual cycle, and that these alterations greatly influence fertility. Katz D F: Am J Obstet Gynecol 1991; 165: 1984–6; Sperof L: Clinical Gynecolgoic Endocrinology and Fertility, $6^{th}$ edition, 1999. As ovulation nears, the electrolyte composition and pH of the mucus changes so as to enhance sperm transport and viability. By using vaginal douches in accordance with the present invention to augment this cyclical variance of the cervical mucus, the ultimate ratio of viable "X" carrying & "Y" carrying sperm being presented to the egg can be altered. "X" carrying sperm have been previously shown to remain viable longer, be somewhat larger and be more capable of surviving in an acidic mucus environment, while "Y" carrying sperm are known to be smaller and to have greater mobility in alkaline mucus environments.

Dietary factors may also influence gender selection. A diet high in alkaline-ash foods and low in sodium and potassium has been shown to create a significant bias for female conceptions, while the converse is true for male conceptions (Stolkowski J: Int. J Gynaecol Obst 18: 440–443, 1980). Supplementation of diet with Vitamin D and Vitamin B6 in accordance with the present invention leads to an increased absorption of the desired nutrients.

Preconception hormonal levels may also influence the conceived gender (James W H. J Theor Biol. 1996; 180: 271–86). Many naturally occurring dietary food products contain estrogen analogues, which show an affinity for binding with estrogen receptors. Furthermore, naturally occurring flavenoids inhibit the metabolism of exogenous phytoestrogens leading to an increased affect of these compounds (Sperof L: Clinical Gynecologic Endocrinology and Fertility, $6^{th}$ edition, 1999).

Gender selection techniques have also included techniques wherein sperm is separated into specimens of different sperm types. These techniques involve the mechanical separation of "X" and "Y" chromosome carrying sperm. However, the resulting specimens typically contain a significant amount of both types of sperm. In accordance with this technique the selected specimen is artificially introduced into the female by trained laboratory technicians under the guidance of a physician in either a medical office, a fertility clinic or hospital. However, the availability of this service is very limited and the service is relatively expensive. This technique is also relatively unreliable in conceiving the desired gender.

Another method for selecting gender involves artificially producing several conceptions in the laboratory and then implanting only those conceptions of the desired gender into the female. This technique is typically limited to couples needing to avoid a sex linked genetic disease. It is also invasive; having the requirement of harvesting multiple eggs from the female with a surgical procedure, and involves the destruction of the conceptions resulting in the wrong gender. This technique is also very expensive and, hence, is not generally available to the public.

These mechanical techniques describing the current and prior art available for gender selection highlight the complexity, cost and limited availability of effective gender selection techniques. But there is a need for an easy to use, effective gender selection program which is available worldwide. Previous attempts to meet this demand focused upon only a limited number of the factors influencing natural gender selection. A need exists for a method and a kit facilitating practice of the method that integrates a system of manipulation of natural factors to influence gender selection and which enables a couple, in the privacy of their own home, to manipulate these factors so as to create a preconception gender selection bias in the favor of the chosen sex.

In accordance with the present invention a method and kit is provided which incorporates lifestyle recommendations, specific dietary guidelines, nutritional supplements including vitamins, minerals & herbs, vaginal douches, chemical ovulation predictors, instructions for determining and assessing the biphasic basal body temperature shift and cervical mucus changes heralding the onset of ovulation along with specific instructions on how to monitor, record and integrate the use and timing of these various aspects. Prior to this invention, no one has provided an integral method and kit product which synergistically combines multiple factors and components into a preconception gender selection method and kit which can be made readily available to the public and used in the privacy of one's own home.

SUMMARY OF THE INVENTION

In accordance with the present invention, a method is provided to take advantage of naturally occurring factors that influence gender selection in such a way as to create a bias to conceive a specific gender. This is accomplished by teaching a woman how to recognize the various stages of her menstrual cycle and how and when to use ovulation predictor reagent strips to accurately predict when ovulation will occur. Specific instructions are provided as to when a couple should engage in intercourse.

A method for influencing the chances of conceiving a child of a selected gender comprises the steps of:

(A) Following a selected diet;

(B) Supplementing said diet with selected nutriceuticals;

(C) Douching with a selected douche prior to intercourse; and (D) Selectively timing intercourse.

A kit is provided with instructions, a temperature measuring device, capsules containing selected nutriceuticals and a douche.

DESCRIPTION OF THE INVENTION

The present invention provides a method for influencing the gender of a child. Many factors influence the female egg's susceptibility to combine successfully with a sperm. While it is somewhat of a random chance as to which sperm will complete the fertilization process, it is believed that the random nature of the process can be influenced by manipulating certain factors in accordance with the method of the present invention, further understanding of which will be had from the following description.

As the time of ovulation grows nearer, it is well known that the quality and quantity of the cervical mucus changes. Studies have shown that the viability, longevity, and motility of the "X" and "Y" chromosome carrying sperm are affected differently by these mucus changes. The utilization of these variables to create a preconception sex selection bias is dependent upon the ability to accurately predict when ovulation is to occur. This can be achieved with ovulation predictors which utilize a chemical reagent strip that detects a rise in urinary luteinizing hormone (LH) which immediately precedes ovulation. Further confirmation that ovulation is approaching can be detected by closely monitoring the cervical mucus changes which are known to occur prior to ovulation. Once ovulation does occur, there is an abrupt cessation in the production of the cervical mucus along with distinct characteristic changes which are easily identifiable. In addition, further confirmatory evidence that ovulation has occurred is achieved with the detection of the biphasic basal body temperature shift which occurs immediately following ovulation and results from the subsequent rise in serum progesterone produced by the corpus luteium (the region of the ovary where the egg was produced).

The vaginal environment and the changes that it undergoes during the normal menstrual cycle can also greatly influence natural gender selection. By taking advantage of these naturally occurring characteristics, a vaginal douche has been developed which amplifies this natural selection process.

Additional studies have confirmed that particular trace elements which are naturally found in the diet can strongly select for either a female conception or male conception. By adhering to certain dietary recommendations supplemented with a specifically formulated nutriceutical supplement, this effect can be greatly enhanced and thereby produce even a greater effect on natural preconception gender selection.

The present invention utilizes a unique multi-modality approach directed towards greatly increasing a couple's chance of conceiving a child with the gender of their choice. This integrated approach allows the naturally occurring gender selection factors to be manipulated in a couple's favor to influence the gender selection of their next child. By carefully following the method of this invention including use of the appropriate diet supplemented with the appropriately formulated nutriceutical tablets and appropriate douche, the preselection of a child's gender can be influenced.

Each step of the present method is simple to perform and by itself would increase the chances of conceiving a child of a desired sex. However, the chances of successfully influencing gender selection are greatly increased if the steps of this method are performed in a methodical and disciplined manner. The present method manipulates several different aspects of natural gender selection so as to create the best chance of conceiving a child of the desired sex during any specific menstrual cycle. The steps are performed largely concurrently in order to maximize the potential for a successful result. By following the method of this invention, a couple can greatly increase their chances of selecting the gender of their children.

Charting a female's basal body temperature has long been utilized to help predict when ovulation occurs and when her chances of conception are greatest. The present method utilizes this naturally occurring physiological phenomena to help determine the appropriate timing of intercourse for gender selection purposes. The technique for determining the basal body temperature is simple, but must be performed accurately and consistently every morning to ensure the best possible results.

The female's daily basal body temperature is preferable taken when she first awakes in the morning. It is very important that this is done prior to any interfering activity such as going to the bathroom, brushing teeth, talking on the phone, eating, drinking, smoking, etc . . . prior to taking the basal body temperature. Furthermore, the temperature should be taken at the same time each morning after at least three consecutive hours of sleep. If the female has gotten up to go to the bathroom during the night, at least three hours of consecutive sleep should have been achieved prior to taking the temperature. Also, use of a heating blanket or consumption of alcohol the night before should be avoided. If the female becomes ill, her body basal temperature reading will become unreliable and these values should not be utilized.

The taking of the female's basal body temperature is conventionally done as is generally instructed on the particular digital basal body temperature thermometer provided by the manufacturer thereof. A chart of the temperatures should be made by drawing a small circle around the temperature on the appropriate menstrual cycle day. The first day of a menstrual cycle is the first day of your menstrual period. Connect the circles with a line. It is quite common for the temperature to rise and fall a few tenths of a degree during the first phase (follicular phase) of the cycle. Typically, near mid cycle, an increase in the basal body temperature of approximately 0.4 degrees will occur and will be sustained throughout the second phase (luteal phase) of the cycle. This abrupt rise in temperature indicates that ovulation has occurred just prior to this biphasic temperature shift. Continued charting of the female's basal body temperature in this manner should be carried out until conception is achieved.

Occasionally, a temperature will be obtained that seems to be excessively high or low for the particular phase of the cycle. If this happens, a determination should be made as to whether the temperature is an aberrant value before drawing a connecting line to this value. If the value appears to be aberrant, it should be ignored and the line should be drawn to the next temperature charted. In this way, a graph is constructed throughout the menstrual cycle which will allow the female to establish the likely time of ovulation. By first determining when this biphasic basal body temperature shift occurs and then applying this knowledge to the present method, the female will be able to predict when the most likely time that ovulation will occur in her forthcoming cycles.

Cervical mucus is a fluid produced by the female's reproductive organs. Its function is an important part of natural fertility. The composition and quantity of this fluid changes dramatically during a normal menstrual cycle. Near ovulation, the fluid becomes more abundant, slippery, and fluid-like. After ovulation, the fluid becomes scant and sticky. These properties not only affect fertility, but they also differentially affect natural gender selection. The detection and interpretation of these cervical mucus changes, when performed appropriately, can be easily applied to the method of this invention so as to increase the probability of achieving the desired gender.

The cervical mucus should be checked beginning on the first day after menstruation has ended and the check is performed at least three times a day (approximately every 8 hours). The mucus is checked either prior to urination or after a bowel movement. This is accomplished by separating the vaginal lips with one hand while the index and middle finger of the other hand are inserted a short distance into the vagina and then wiped forward across the inner aspect of the vaginal lips. If fluid is detected, it is then rubbed between the index finger and thumb. It is then determined whether or not the fluid feels dry, sticky, or slippery, what the color of the fluid is, and whether there is only a small amount present or a lot? Also, the thumb and index finger should be separated to see if the fluid stretches, and if so, how long it stretches before breaking? Immediately following menstruation, it is common for a female not to produce any significant amount of cervical mucus. After a few days, the initial mucus detected is usually sticky and white or yellowish in color. There is typically only a small amount and there is very little, if any, stretching of the fluid. As the time to ovulation nears, the fluid becomes more abundant. The color may take on more of a white appearance similar to lotion. It is more slippery and will begin to stretch a small amount. On the final day or so prior to ovulation, the cervical mucus typically is abundant, fairly clear with occasional white streaks, and has the consistency of egg whites. When stretched between the thumb and index finger, the fluid may stretch anywhere from one to six inches prior to breaking. Once ovulation occurs, there is a rapid reversal in the quantity and consistency of the cervical mucus which then resembles the scant and sticky fluid detected following menstruation.

It is important that hands are washed before and after checking your cervical mucus so as not to contaminate the vaginal environment. Also, various factors can artificially influence the quality of the cervical mucus prior to manual detection. Such examples include checking the cervical mucus after urination has occurred. Sexual arousal and intercourse can also significantly change the cervical mucus and therefore the mucus should not be checked at these times.

The cervical mucus is checked and should be charted beginning on the first day following menstruation. If no fluid is detected, a (–) is placed in the box for that cycle day. When fluid is present but is creamy looking and slightly sticky, place a (\) should be placed in the box. When the fluid is abundant, mainly clear, slippery, and stretches easily (greater than one inch), an (X) is placed in the box. The "peak" fertility day is the last day that the cervical mucus was abundant, slippery, clear, and easily stretches. The box on this day should be completely filled in (O). Soon after ovulation occurs, the cervical mucus changes back to a dry and sticky consistency. This is due to the presence of progesterone which is produced by the corpus luteum which is the remnant of the original ovarian follicle which produced the egg. This production of progesterone also leads to a rise in basal body temperature which produces the biphasic basal body temperature response. Subsequently, the cervical mucus peak day should occur one or two days before the biphasic basal body temperature shift. Once the biphasic body temperature shift has occurred, the cervical mucus should once again be scant and sticky.

Conception can occur only after ovulation, i.e., the release of an egg from one of the ovaries, has occurred. The egg is then capable of being fertilized for only the next several hours. Knowing when ovulation is likely to occur is very important in conception and in the natural gender selection process.

Immediately prior to ovulation, the body produces a surge of luteinizing hormone (LH). This LH surge induces the ovary to release its egg (i.e. ovulate). The LH surge can be detected by an increased level of LH in the urine which typically occurs approximately 24–36 hours before ovulation. This information is used to greatly enhance the ability to determine when ovulation is likely to occur and the choice of the sex of your next child.

The length of the menstrual cycle amongst females varies considerably. However, the menstrual cycle of an individual female typically remains consistent from one cycle to the next. The length of the typical menstrual cycle is 26–28 days; however, some women will have cycles as short as 21 days and as long as 40 days. Once again, the length of a menstrual cycle is determined by the number of days from the first day of menstrual bleeding to the last day before the next period begins. It is important that the female has a good understanding of this concept and also has a good understanding of how long her typical menstrual cycle is. If the female is unsure of these issues, it is a good idea to chart the basal body temperature and cervical mucus changes for several menstrual cycles until she is comfortable with and able to interpret her menstrual cycle. The ovulation predictors are to be utilized beginning 36 hours prior to the expected date of ovulation or 24 hours prior to the cycle day of her earliest ovulation in previously monitored cycles. The ovulation predictors are to be utilized every 12 hours, at 10 a.m. and 10 p.m. until a positive result is achieved. In preparation of the test, it is important to have a watch, clock, or timer available. It is important that she refrains from urinating for at least four hours prior to the testing. The test is easy to perform and should be conducted as follows:

First, the test stick is removed from its protective foil pouch. The cap is removed from the test stick and the test stick is held with the absorbent tip pointing down. The absorbent tip is held directly in the urine stream for at least ten seconds. Alternatively, urine may be collected in a clean, dry cup and the absorbent tip is held at least halfway into the urine for at least ten seconds. Then the cap is replaced over the wet absorbent tip and the stick is placed on a flat surface with the windows facing up. A light pink color moves through the windows as the test begins to work. In about three minutes, the colored line(s) will appear in the window (s). The results can be read in between 3–10 minutes as described in the following. To verify a negative result, allow the test to run for a full ten minutes.

A positive result means the urine contains a high level of LH. This indicated that ovulation will occur within 24–36 hours and it is not necessary to perform any further testing.

A negative result means that no LH surge has been detected and further testing will be required. Occasionally, a woman will have a cycle in which ovulation does not occur. Subsequently, all tests will return negative. If the female's menstrual cycles have been consistently regular prior to this attempt, it is quite likely that an error was made in the estimated time of ovulation. It is a good idea to have additional ovulation predictors and to continue to check for the LH surge on a 12-hour basis. If no LH surge is detected, it is most probable that ovulation did not occur during this cycle and an additional attempt will need to be made in future cycles.

It is important to know that these tests are over 98% accurate. They are not affected by most medications or other dietary supplements. The test results can be in error, however, if medications containing hCG or LH are being utilized. Furthermore, pregnant women, those women taking birth control pills, or women who are breast-feeding can also have inaccurate results.

The "X" carrying sperm and the "Y" carrying sperm have different distinct characteristics that impact natural gender selection. "X" carrying sperm are larger, live longer, and are more apt to survive in the preovulatory vaginal environment when compared to the "Y" carrying sperm. In contrast to this, the "Y" carrying sperm are better swimmers and have a distinct advantage at the time of ovulation when the cervical mucus is most conducive for conception. The method of the present invention takes advantage of this variance by timing intercourse in relation to ovulation so as to create a selection bias for the gender of choice.

The particular kit provided is designed specifically for the preconception gender selection for either a male or female. For example in a male kit, the method requires intercourse at the time of ovulation to have a greater chance of conceiving a boy. By accurately identifying the biphasic basal body temperature shift, correctly interpreting the changes in the cervical mucus, and with the appropriate utilization of the ovulation predictors, one should be able to predict with confidence when ovulation is most likely to occur. The selection for a male offspring requires that intercourse be performed as close to ovulation as possible. This is most likely to occur approximately 24 hours after the ovulation predictor has turned positive, if used appropriately. At this time, the cervical mucus is most conducive for conception and provides the most optimal environment for the sperm to survive and gain access to the egg. It is at this time that the "Y" carrying sperm will have a distinct advantage in their journey to the egg. To maximize the number of "Y" sperm present, the male will need to abstain from ejaculation for approximately four days prior to this episode of intercourse.

Additional natural factors that can influence gender selection include the composition of the cervical fluid that is produced when a woman has an orgasm. This composition also imparts a selection bias for the "Y" carrying sperm and subsequently it is recommended that the female have an orgasm prior to or at the time of male ejaculation.

Once ejaculation is completed, sexual intercourse should then be discontinued so as not to dislodge any of the sperm from the vaginal vault. The female should then lie in a comfortable position for at least 30 minutes. It is important for the female not to urinate or have a bowel movement soon after intercourse, as this will expel a large portion of the ejaculate out of her vaginal vault. Intercourse should not be performed then for the next four days. It is important that the female continue to chart her basal body temperature as previously instructed. If a conception has been achieved, the basal body temperature will remain slightly elevated; however, if no conception was achieved during this cycle, the basal body temperature will significantly decline immediately prior to the onset of menstruation.

The alternative kit of the present invention is designed specifically for the preconception gender selection for a female. It has been found that intercourse that occurs approximately three days prior to ovulation has a greater chance of conceiving a girl. By accurately identifying the biphasic basal body temperature shift, correctly interpreting the changes in the cervical mucus, and with the appropriate utilization of the ovulation predictors in previous menstrual cycles, you should be able to predict with confidence when ovulation will occur. The selection for a female offspring requires that intercourse be performed on day 6, 5, 4, and 3 prior to the onset of ovulation. For example, if the predicted date of ovulation is cycle day 17, and the ovulation predictor turned positive with the 10 p.m. testing, intercourse should be performed up to 72 hours prior to this time which would be 10 p.m. on cycle day 14. Intercourse should also be performed on cycle day 13, 12, and 11. Studies have shown that the percentage of "X" carrying sperm per ejaculation is increased following multiple daily ejaculatory events. It is very important not to have any additional intercourse until four days following ovulation. It is also recommended that the woman not achieve orgasm during intercourse, as this has been shown to influence the composition of the cervical mucus which may increase the likelihood of a "Y" carrying sperm being successful in conception.

Following ejaculation by the male, intercourse should be immediately terminated so as not to dislodge any of the ejaculate from the vaginal vault. It is recommended that the woman then lie in a comfortable position for approximately 30 minutes. It is not advisable to urinate or have a bowel movement soon after intercourse, as this will expel a large portion of the ejaculate from the vaginal vault. It is important that the female continue to monitor her biphasic basal body temperature and chart them as previously instructed. If a conception has occurred, the basal body temperature will remain elevated. If no conception is achieved, the basal body temperature will significantly drop immediately prior to the onset of menstruation.

As previously discussed, the vaginal environment and cervical mucus can greatly influence the chances that either an "X" carrying sperm or "Y" carrying sperm will be successful in fertilizing the egg. These factors can be enhanced by instilling within the vaginal vault specifically formulated douching compounds which augment this selectivity. Douches are formulated specifically for each gender selection.

In a male preconception Kit, it is important that the douche be utilized approximately 30 minutes prior to intercourse on the day of ovulation. This is the only time that douching will be required.

In a female preconception kit, it is important to douche approximately 30 minutes prior to the last episode of intercourse occurring approximately three days prior to the time of expected ovulation. This will be the only time that douching will be required.

Douching is performed by initially twisting off the cap on the douche bottle. The provided nozzle is screwed onto the bottle until firmly attached. There are two recommended positions douching: 1) Sitting on the toilet, and 2) Standing in the shower. The nozzle is gently inserted about three inches into the vagina. Avoiding closing the lips of the vagina, and the bottle is gently squeezed, allowing the solution to enter into the vaginal vault and then flow freely from the body. The fluid is not intended to be retained. After douching, the bottle and nozzle are discarded appropriately and the hands are washed. The douching solution may or may not produce a slight odor and if so, this is to be expected. Intercourse will need to be performed within 30 minutes of completing the douching.

For many generations, it has been believed that certain lifestyles and dietary factors can influence the natural gender selection process. Over the last few decades, several studies have indicated that this is true. Now, and in accordance with the present invention a preferred nutriceutical tablet is provided which greatly enhances a variety of factors, which occur during the menstrual cycle, known to be responsible for natural gender selection.

Utilization of the Nutriceutical

The nutriceuticals developed are specific for selecting either a male offspring or a female offspring. Generally speaking, nutriceutical tablet comprising sodium and potassium is provided for formula X and a nutriceutical tablet comprising calcium and magnesium is provided for forumula Y. Composed of naturally occurring minerals, vitamins, and herbs, these tablets have been specifically formulated to augment those bodily functions which influence the natural gender selection process. The tablets are provided in an easy to use blister packet which is dated to coincide with the days of the female's menstrual cycle. These tablets are to be taken three times a day and can be consumed with or without food. The nutriceutical should be taken approximately every eight hours, with the first tablet being taken typically with breakfast, the second tablet taken in mid afternoon, and the third tablet being taken at night prior to bedtime. The dispensing packet is specifically constructed so that nutriceutical day 16 should coincide with the expected day of ovulation. If the predicted ovulation date is on day 17 or later, subtract 16 from this ovulation day and this will be the day upon which taking the nutriceuticals should begin. If the predicted ovulation day is on day 16 or earlier, the nutriceuticals should be taken starting on the first day of the menstrual cycle. On day 17 of the nutriceutical packet, just one pill a day is taken and this will be continued until day 30 when the nutriceuticals will be exhausted.

Preferred examples of nutriceutical formulas are:

FORMULA X

| | |
|---|---|
| calcium carbonate | 1500 mg |
| magnesium oxide | 500 mg |
| vitamin C | 60 mg |
| folic acid | 80 mcg |
| vitamin B6 | 10 mg |
| vitamin D | 400 iu |
| dong quai | 300 mg |
| black cohosh | 40 mg |
| chaste berry | 20 mg |
| red clover | 40 mg |
| color: pink | |

FORMULA Y

| | |
|---|---|
| KCl | 20 mEq |
| Vitamin C | 60 mg |
| Folic acid | 800 mcg |
| Potassium iodide | 750 mg |
| NaHCO3 | 1000 mg |
| Astragalus | 300 mg |
| Sarsaparilla | 500 mg |
| Color: blue | |

FILLERS carnuba wax
croscarmellose sodium ("Y" only)
ethylcellulose
magnesium stearate ("X" only)
microcystalline cellulose
silicone dioxide
stearic acid
FD & C blue #1 ("Y" only)\

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for influencing the chances of conceiving a child of a selected gender in a female who wants to influence the chances of conceiving a child of a selected gender comprising the steps of:

a) administering to said female a nutraceutical supplement selected from the group consisting of:

i) a nutraceutical supplement comprising

| | |
|---|---|
| KCl | 20 mEq |
| Vitamin C | 60 mg |
| Folic acid | 800 mcg |
| Potassium iodide | 750 mg |
| NaHCO$_3$ | 1000 mg |
| Astragalus | 300 mg |
| Sarsaparilla | 500 mg | for a male child, and ii) a nutraceutical supplement comprising

| | |
|---|---|
| calcium carbonate | 1500 mg |
| magnesium oxide | 500 mg |
| vitamin C | 60 mg |
| folic acid | 80 mcg |

-continued

| | |
|---|---|
| vitamin B6 | 10 mg |
| vitamin D | 400 IU |
| dong quai | 300 mg |
| black cohosh | 40 mg |
| chaste berry | 20 mg |
| red clover | 40 mg | for a female child;
b) determining the beginning of ovulation of said female using an ovulation predictor;
c) administering to said female, prior to intercourse, a douche selected to influence the chances of conceiving a child of a selected gender; and
d) having said female select the timing of intercourse to influence the chances of conceiving a child of a selected gender.

2. The method of claim 1 wherein the beginning of ovulation is determined using a chemical reagent strip that detects a rise in urinary luteinizing hormone.

3. The method of claim 1 wherein the beginning of ovulation is determined by charting said female's basal body temperature.

4. The method of claim 1 wherein the timing of intercourse is selected to be about 24 hours after ovulation to influence the chances of conceiving a male child.

5. The method of claim 1 wherein the timing of intercourse is selected to be about 72 hours before ovulation to influence the chances of conceiving a female child.

6. The method of claim 4 wherein a douche selected to influence the chances of conceiving a male child is administered about 30 minutes prior to intercourse.

7. The method of claim 5 wherein a douche selected to influence the chances of conceiving a female child is administered about 30 minutes prior to intercourse.

* * * * *